United States Patent
Mishra et al.

(10) Patent No.: US 11,016,957 B2
(45) Date of Patent: May 25, 2021

(54) SENSOR DATA BASED QUERY RESULTS

(71) Applicant: Microsoft Technology Licensing, LLC, Redmond, WA (US)

(72) Inventors: Abhineet Mishra, Bothell, WA (US); Sravanth Venkata Madhu Kurumaddali, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 210 days.

(21) Appl. No.: 15/908,342

(22) Filed: Feb. 28, 2018

(65) Prior Publication Data

US 2019/0266266 A1 Aug. 29, 2019

(51) Int. Cl.
| | |
|---|---|
| *G06F 16/22* | (2019.01) |
| *G06F 3/06* | (2006.01) |
| *G06F 16/9537* | (2019.01) |
| *G06F 16/2457* | (2019.01) |
| *G06F 16/903* | (2019.01) |
| *G06F 16/245* | (2019.01) |
| *H04W 84/18* | (2009.01) |

(52) U.S. Cl.
CPC ........ *G06F 16/2228* (2019.01); *G06F 3/0611* (2013.01); *G06F 16/245* (2019.01); *G06F 16/24578* (2019.01); *G06F 16/90335* (2019.01); *G06F 16/9537* (2019.01); *H04W 84/18* (2013.01)

(58) Field of Classification Search
CPC .................................................. G06F 16/2228
USPC ........................................................ 707/752
See application file for complete search history.

(56) References Cited

U.S. PATENT DOCUMENTS

| | | | |
|---|---|---|---|
| 7,716,199 | B2 | 5/2010 | Guha |
| 2007/0038616 | A1 | 2/2007 | Guha |
| 2007/0060114 | A1 | 3/2007 | Ramer et al. |
| 2007/0208785 | A1 | 9/2007 | Hayashi et al. |
| 2009/0094223 | A1 | 4/2009 | Berk et al. |
| 2012/0197911 | A1* | 8/2012 | Banka ............ H04L 67/12 707/752 |
| 2014/0303828 | A1* | 10/2014 | Joshi ............ G05D 1/021 701/23 |

(Continued)

FOREIGN PATENT DOCUMENTS

| | | |
|---|---|---|
| EP | 3131040 A1 | 2/2017 |
| WO | 2017130002 A1 | 8/2017 |

OTHER PUBLICATIONS

"International Search Report and Written Opinion Issued in PCT Application No. PCT/US19/018445", dated Apr. 25, 2019, 12 Pages.

(Continued)

*Primary Examiner* — Syling Yen

(57) ABSTRACT

A system for generating sensor data based query results can include a processor to detect sensor data from a plurality of sensors and store the sensor data as aggregated sensor data. The sensor data can be aggregated based on a time corresponding to the sensor data, wherein the sensor data is stored with a notification based push operation in response to a change in value of the sensor data exceeding a predetermined threshold. The processor can also convert the aggregated sensor data to an indexable data format (IDF) and provide a low latency query result to a query based on the aggregated sensor data in the IDF.

20 Claims, 7 Drawing Sheets

(56) References Cited

U.S. PATENT DOCUMENTS

| | | |
|---|---|---|
| 2014/0365434 A1* | 12/2014 | Chen .................... G06F 16/275 |
| | | 707/611 |
| 2017/0126836 A1* | 5/2017 | Krishna .............. G06F 16/9535 |
| 2017/0219544 A1* | 8/2017 | McMillan ............. G01N 27/045 |
| 2017/0244827 A1* | 8/2017 | Kang .................... G06F 1/3231 |
| 2017/0308292 A1 | 10/2017 | Choi |
| 2017/0308801 A1* | 10/2017 | Cai .................... G05B 23/0229 |
| 2018/0039691 A1 | 2/2018 | Hazra et al. |
| 2018/0052925 A1* | 2/2018 | Cohn .................. G06F 16/3329 |
| 2018/0224150 A1* | 8/2018 | Lewis .................... F24F 11/49 |
| 2018/0242058 A1* | 8/2018 | Hayakawa ............... H04Q 9/02 |
| 2018/0330728 A1 | 11/2018 | Gruenstein et al. |
| 2019/0049256 A1* | 2/2019 | Camp ................ G01C 21/3453 |
| 2019/0347358 A1 | 11/2019 | Mishra et al. |

OTHER PUBLICATIONS

"International Search Report and Written Opinion Issued in PCT Patent Application No. PCT/US19/029533", dated Jul. 4, 2019, 10 Pages.

"Non Final Office Action Issued in U.S. Appl. No. 15/975,919", dated Mar. 18, 2020, 42 Pages.

"Final Office Action Issued in U.S. Appl. No. 15/975,919", dated Nov. 24, 2020, 57 Pages.

* cited by examiner

SENSOR DATA BASED QUERY RESULTS

BACKGROUND

Computer devices can be coupled to any suitable number of sensors. In some examples, the sensors can detect sensor data indicating various characteristics of the operating environment of a computing device. For example, the sensor data can indicate video sensor data, temperature sensor data, user sensor data, and the like. In some embodiments, applications can detect the sensor data and use the sensor data to execute application instructions.

SUMMARY

The following presents a simplified summary in order to provide a basic understanding of some aspects described herein. This summary is not an extensive overview of the claimed subject matter. This summary is not intended to identify key or critical elements of the claimed subject matter nor delineate the scope of the claimed subject matter. This summary's sole purpose is to present some concepts of the claimed subject matter in a simplified form as a prelude to the more detailed description that is presented later.

An embodiment described herein includes a system for generating sensor data based query results, wherein the system can include a processor to detect sensor data from a plurality of sensors. The processor can also store the sensor data as aggregated sensor data, wherein the sensor data is aggregated based on a time corresponding to the sensor data, and wherein the sensor data is stored with a notification based push operation in response to a change in value of the sensor data exceeding a predetermined threshold. Additionally, the processor can convert the aggregated sensor data to an indexable data format (IDF) and provide a low latency query result to a query based on the aggregated sensor data in the IDF.

In another embodiment, a method for generating sensor data based query results can include detecting sensor data from a plurality of sensors. The method can also include storing the sensor data as aggregated sensor data, wherein the sensor data is aggregated based on a time corresponding to the sensor data, and wherein the sensor data is stored with a notification based push operation in response to a change in value of the sensor data exceeding a predetermined threshold. Additionally, the method can include converting the aggregated sensor data to an indexable data format (IDF) and providing a low latency query result to a query based on the aggregated sensor data in the IDF.

In yet another embodiment, one or more computer-readable storage media for generating sensor data based query results can include a plurality of instructions that, in response to execution by a processor, cause the processor to detect sensor data from a plurality of sensors. The plurality of instructions can also cause the processor to store the sensor data as aggregated sensor data, wherein the sensor data is aggregated based on a time corresponding to the sensor data, and wherein the sensor data is stored with a notification based push operation in response to a change in value of the sensor data exceeding a predetermined threshold. Additionally, the plurality of instructions can also cause the processor to convert the aggregated sensor data to an indexable data format (IDF) and provide a low latency query result to a query based on the aggregated sensor data in the IDF.

The following description and the annexed drawings set forth in detail certain illustrative aspects of the claimed subject matter. These aspects are indicative, however, of a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

BRIEF DESCRIPTION OF THE DRAWINGS

The following detailed description may be better understood by referencing the accompanying drawings, which contain specific examples of numerous features of the disclosed subject matter.

DETAILED DESCRIPTION

Users can be associated with a growing number of sensors, which can be embedded in physical devices, vehicles, home appliances, and other devices. Connecting these devices and enabling the devices to exchange data can also be referred to as the internet of things. Accordingly, a user can be associated with steps logged by a pedometer, a distance travelled that is detected by a global positioning satellite sensor, a speed at which a user is travelling that is detected by an accelerometer, or a heart rate or temperature of a user that is detected by a fitness wearable sensor, among others. In some embodiments, a digital assistant can detect search queries from a user and provide responses using a web based search associated with the search queries. However, the search queries of a user can also be satisfied based on sensor data collected by the various sensors associated with a user.

Techniques described herein include a system for generating sensor data based query results. The system can detect sensor data from a plurality of sensors and store the sensor data as aggregated sensor data. In some examples, the sensor data is stored with a notification based push operation in response to a change in value of the sensor data exceeding a predetermined threshold. Additionally, the system can convert the aggregated sensor data to an indexable data format (IDF) and provide a low latency query result to a query based on the aggregated sensor data in the indexable data format.

Accordingly, techniques described herein can enable a user to retrieve sensor data based query results. In some examples, a system for generating the sensor data based query results can limit an amount of sensor data that is collected based on a predetermined threshold. Therefore, the techniques described herein can enable an enhanced method for searching collected sensor data in order to provide a sensor data based query result for a user query. In some embodiments, the user query can be detected from a digital assistant with a first device and the sensor data can be collected from any number of sensors that can exchange data with a web search engine accessible by the digital assistant. In some examples, the sensor data based query result can include correlating the sensor data from multiple different sensors.

The techniques described herein can reduce the amount of storage used to collect sensor data. The techniques described herein can also reduce the processing time of a processor by searching a smaller dataset of sensor data. Additionally, the techniques described herein can reduce power consumption of a computing device by reducing a time to execute a search query based on stored sensor data.

Figure 1:
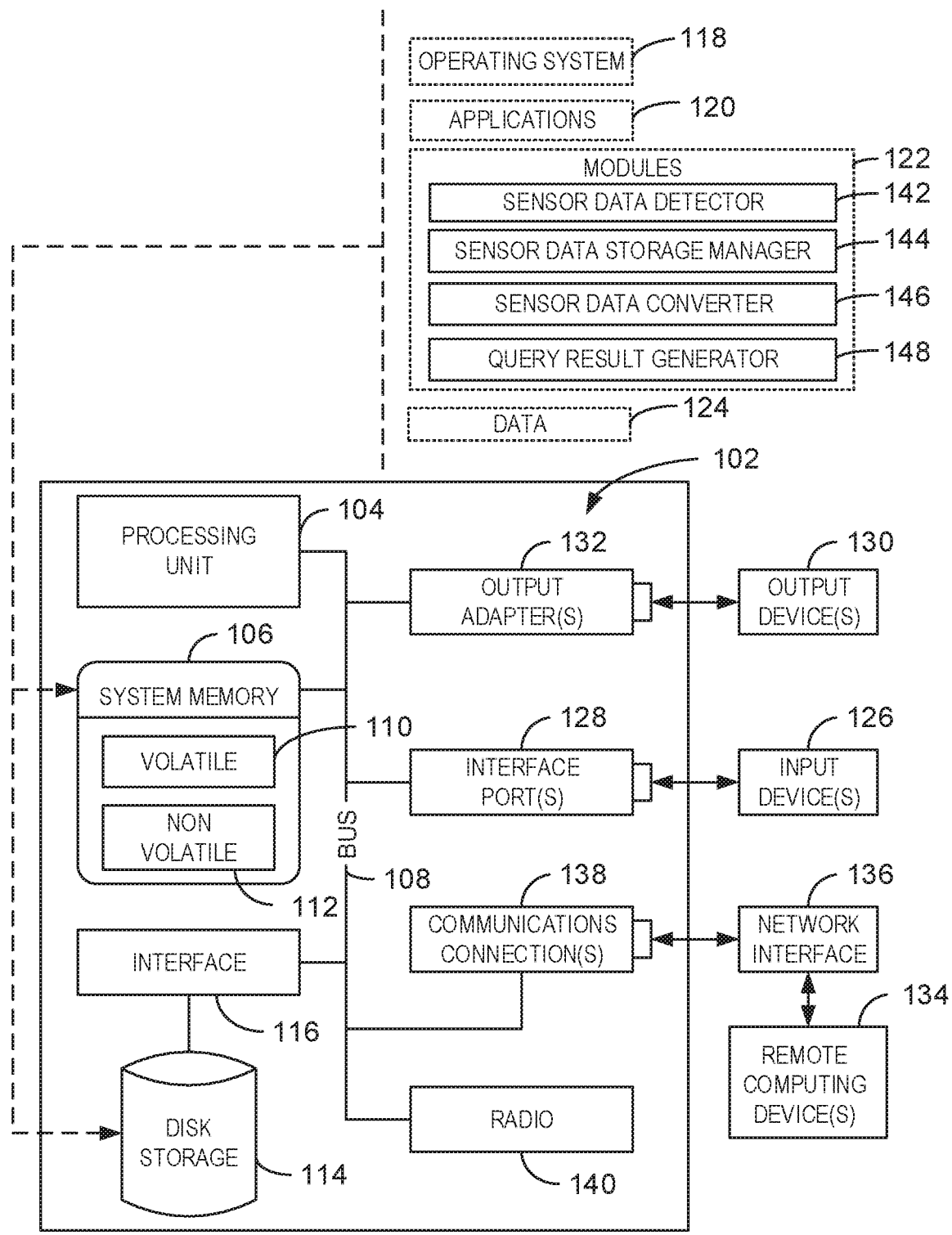
FIG. 1 is a block diagram of an example of a computing system that can generate sensor data based query results.

As a preliminary matter, some of the figures describe concepts in the context of one or more structural components, referred to as functionalities, modules, features, elements, etc. The various components shown in the figures can be implemented in any manner, for example, by software, hardware (e.g., discrete logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component. FIG. 1 discussed below, provide details regarding different systems that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, and the like, or any combination of these implementations. As used herein, hardware may include computer systems, discrete logic components, such as application specific integrated circuits (ASICs), and the like, as well as any combinations thereof.

As for terminology, the phrase "configured to" encompasses any way that any kind of structural component can be constructed to perform an identified operation. The structural component can be configured to perform an operation using software, hardware, firmware and the like, or any combinations thereof. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware.

The term "logic" encompasses any functionality for performing a task. For instance, each operation illustrated in the flowcharts corresponds to logic for performing that operation. An operation can be performed using software, hardware, firmware, etc., or any combinations thereof.

As utilized herein, terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any tangible, computer-readable device, or media.

Computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not storage media) may additionally include communication media such as transmission media for wireless signals and the like.

FIG. 1 is a block diagram of an example of a computing system that can generate sensor data based query results. The example system 100 includes a computing device 102. The computing device 102 includes a processing unit 104, a system memory 106, and a system bus 108. In some examples, the computing device 102 can be a gaming console, a personal computer (PC), an accessory console, a gaming controller, among other computing devices. In some examples, the computing device 102 can be a node in a cloud network.

The system bus 108 couples system components including, but not limited to, the system memory 106 to the processing unit 104. The processing unit 104 can be any of various available processors. Dual microprocessors and other multiprocessor architectures also can be employed as the processing unit 104.

The system bus 108 can be any of several types of bus structure, including the memory bus or memory controller, a peripheral bus or external bus, and a local bus using any variety of available bus architectures known to those of ordinary skill in the art. The system memory 106 includes computer-readable storage media that includes volatile memory 110 and nonvolatile memory 112.

In some embodiments, a unified extensible firmware interface (UEFI) manager or a basic input/output system (BIOS), containing the basic routines to transfer information between elements within the computer 102, such as during start-up, is stored in nonvolatile memory 112. By way of illustration, and not limitation, nonvolatile memory 112 can include read-only memory (ROM), programmable ROM (PROM), electrically programmable ROM (EPROM), electrically erasable programmable ROM (EEPROM), or flash memory.

Volatile memory 110 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM).

The computer 102 also includes other computer-readable media, such as removable/non-removable, volatile/non-volatile computer storage media. FIG. 1 shows, for example a disk storage 114. Disk storage 114 includes, but is not limited to, devices like a magnetic disk drive, floppy disk drive, tape drive, Jaz drive, Zip drive, LS-210 drive, flash memory card, or memory stick.

In addition, disk storage 114 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 114 to the system bus 108, a removable or non-removable interface is typically used such as interface 116.

It is to be appreciated that FIG. 1 describes software that acts as an intermediary between users and the basic computer resources described in the suitable operating environment 100. Such software includes an operating system 118. Operating system 118, which can be stored on disk storage 114, acts to control and allocate resources of the computer 102.

System applications 120 take advantage of the management of resources by operating system 118 through program modules 122 and program data 124 stored either in system memory 106 or on disk storage 114. It is to be appreciated that the disclosed subject matter can be implemented with various operating systems or combinations of operating systems.

A user enters commands or information into the computer 102 through input devices 126. Input devices 126 include, but are not limited to, a pointing device, such as, a mouse, trackball, stylus, and the like, a keyboard, a microphone, a joystick, a satellite dish, a scanner, a TV tuner card, a digital camera, a digital video camera, a web camera, any suitable dial accessory (physical or virtual), and the like. In some examples, an input device can include Natural User Interface (NUI) devices. NUI refers to any interface technology that enables a user to interact with a device in a "natural" manner, free from artificial constraints imposed by input devices such as mice, keyboards, remote controls, and the like. In some examples, NUI devices include devices relying on speech recognition, touch and stylus recognition, gesture recognition both on screen and adjacent to the screen, air gestures, head and eye tracking, voice and speech, vision, touch, gestures, and machine intelligence. For example, NUI devices can include touch sensitive displays, voice and speech recognition, intention and goal understanding, and motion gesture detection using depth cameras such as stereoscopic camera systems, infrared camera systems, RGB camera systems and combinations of these. NUI devices can also include motion gesture detection using accelerometers or gyroscopes, facial recognition, three-dimensional (3D) displays, head, eye, and gaze tracking, immersive augmented reality and virtual reality systems, all of which provide a more natural interface. NUI devices can also include technologies for sensing brain activity using electric field sensing electrodes. For example, a NUI device may use Electroencephalography (EEG) and related methods to detect electrical activity of the brain. The input devices 126 connect to the processing unit 104 through the system bus 108 via interface ports 128. Interface ports 128 include, for example, a serial port, a parallel port, a game port, and a universal serial bus (USB).

Output devices 130 use some of the same type of ports as input devices 126. Thus, for example, a USB port may be used to provide input to the computer 102 and to output information from computer 102 to an output device 130.

Output adapter 132 is provided to illustrate that there are some output devices 130 like monitors, speakers, and printers, among other output devices 130, which are accessible via adapters. The output adapters 132 include, by way of illustration and not limitation, video and sound cards that provide a means of connection between the output device 130 and the system bus 108. It can be noted that other devices and systems of devices provide both input and output capabilities such as remote computing devices 134.

The computer 102 can be a server hosting various software applications in a networked environment using logical connections to one or more remote computers, such as remote computing devices 134. The remote computing devices 134 may be client systems configured with web browsers, PC applications, mobile phone applications, and the like. The remote computing devices 134 can be a personal computer, a server, a router, a network PC, a workstation, a microprocessor based appliance, a mobile phone, a peer device or other common network node and the like, and typically includes many or all of the elements described relative to the computer 102.

Remote computing devices 134 can be logically connected to the computer 102 through a network interface 136 and then connected via a communication connection 138, which may be wireless. Network interface 136 encompasses wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection 138 refers to the hardware/software employed to connect the network interface 136 to the bus 108. While communication connection 138 is shown for illustrative clarity inside computer 102, it can also be external to the computer 102. The hardware/software for connection to the network interface 136 may include, for exemplary purposes, internal and external technologies such as, mobile phone switches, modems including regular telephone grade modems, cable modems and DSL modems, ISDN adapters, and Ethernet cards.

The computer 102 can further include a radio 140. For example, the radio 140 can be a wireless local area network radio that may operate one or more wireless bands. For example, the radio 140 can operate on the industrial, scientific, and medical (ISM) radio band at 2.4 GHz or 5 GHz. In some examples, the radio 140 can operate on any suitable radio band at any radio frequency.

The computer 102 includes one or more modules 122, such as a sensor data detector 142, a sensor data storage manager 144, a sensor data converter 146, and a query result generator 148. In some embodiments, the sensor data detector 142 can detect sensor data from a plurality of sensors. The sensors can include weather based sensors, user based sensors to monitor a location of a user, fitness or health based sensors to measure a user's heart rate or temperature, and the like. In some embodiments, the sensor data storage manager 144 can store the sensor data as aggregated sensor data, wherein the sensor data is aggregated based on a time corresponding to the sensor data. In some embodiments, the sensor data is stored with a notification based push operation in response to a change in value of the sensor data exceeding a predetermined threshold. For example, the detected sensor data may be discarded or deleted unless the sensor data deviates in value from previously detected sensor data by an amount that exceeds a predetermined threshold. In some embodiments, the sensor data converter 146 can convert the aggregated sensor data to an indexable data format (IDF). In some embodiments, the query result generator 148 can provide a low latency query result to a query based on the aggregated sensor data in the indexable data format.

It is to be understood that the block diagram of FIG. 1 is not intended to indicate that the computing system 102 is to include all of the components shown in FIG. 1. Rather, the computing system 102 can include fewer or additional components not illustrated in FIG. 1 (e.g., additional applications, additional modules, additional memory devices, additional network interfaces, etc.). Furthermore, any of the functionalities of the sensor data detector 142, sensor data storage manager 144, sensor data converter 146, and query result generator 148 may be partially, or entirely, implemented in hardware and/or in the processing unit (also referred to herein as a processor) 104. For example, the functionality may be implemented with an application specific integrated circuit, in logic implemented in the processing unit 104, or in any other device.

Figure 2:
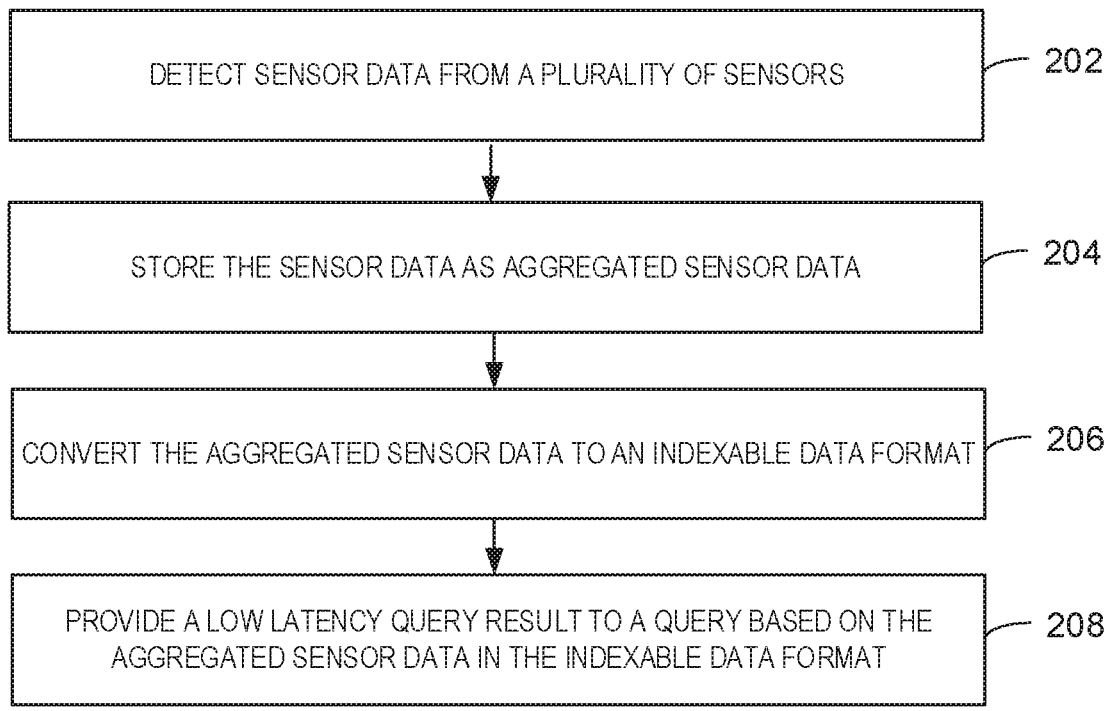
FIG. 2 is a process flow diagram of an example method for generating sensor data based query results.

FIG. 2 is a process flow diagram of an example method for generating sensor data based query results. The method 200 can be implemented with any suitable computing device, such as the computing system 102 of FIG. 1.

At block 202, a sensor data detector 142 can detect sensor data from a plurality of sensors. In some embodiments, the plurality of sensors can include pedometers, thermometers, magnetometers, accelerometers, barometers, video sensors, traffic sensors, pressure sensors, cameras, humidity sensors, and the like. In some examples, the sensor data can include weather information, image information, and user health information such as heart rate, or a number of steps walked, among others. In some embodiments, the sensor data detector 142 can detect that the plurality of sensors are associated with a user requesting a query. For example, the sensor data detector 142 may detect a user identifier associated with the detected sensor data.

At block 204, a sensor data storage manager 144 can store the sensor data as aggregated sensor data. In some examples, the sensor data can be aggregated based on a time corresponding to the sensor data. For example, the sensor data can be aggregated based on a time period in which sensors detected the sensor data. In some examples, the sensor data can be stored with a notification based push operation in response to a change in value of the sensor data exceeding a predetermined threshold. For example, the sensor data storage manager 144 may discard changes in sensor data below the predetermined threshold to reduce storage utilization by the sensors. In some examples, the predetermined threshold is based on a type of sensor detecting the sensor data. For example, the sensor data storage manager 144 may detect a five degree threshold for a thermometer that indicates changes in temperature of five degrees or more are to be stored. Otherwise, smaller changes in temperature can be discarded or deleted. In some examples, the notification based push operation can transmit any change in sensor data that is to be stored to an intermediate storage device. The intermediate storage device can enable offline processing of the sensor data as discussed in greater detail below in relation to FIG. 3.

At block 206, a sensor data converter 146 can convert the aggregated sensor data to an indexable data format (IDF). In some examples, an indexable data format can include any suitable number of element values such as a sensor globally unique identifier, a sensor name, a user identifier, a device identifier, a compressed data indicator, a time when a notification for receiving the sensor data was generated, a sensor type, a time when sensor data was recorded, and a data type, among others. In some embodiments, the sensor data converter 146 can store the aggregated sensor data in the indexable data format in an offline storage device.

At block 208, a query result generator 148 can provide a low latency query result to a query based on the aggregated sensor data in the indexable data format. A query can be detected from a user interface, or a digital personal assistant, among others. In some examples, the low latency query result can be generated with the limited number of stored sensor data based on value changes that exceed predetermined thresholds. In some embodiments, the low latency query results comprise sensor data that is correlated based on any suitable characteristic such as location information, user information, device information, and the like. In some embodiments, the low latency query result can include one of the plurality of sensors that consumed an amount of power that exceeds a power threshold during a period of time.

In some examples, the sensor data is detected by a pedometer and the query result generator 148 can correlate the sensor data by the location information indicating an amount of activity perform at a plurality of locations. For example, the query result generator 148 can group a number of steps taken by a user based on a location of the user at the time of the steps.

In some embodiments, the query result generator 148 can generate a ranking of each of the plurality of sensors based on the query and the sensor data. In some examples, the query result generator 148 can generate the low latency query result, wherein the low latency query result comprises sensor data organized based on the ranking of the plurality of sensors. For example, the ranking of the sensors can depend on a predetermined reliability value or a user preference assigned to each sensor. In some examples, the query result generator 148 can generate the low latency query result based on sensors with a high predetermined reliability value or sensors that are selected as a user's preference. In some embodiments, the query result generator 148 can generate a personalized index of the sensor data for the user, and a low latency query result based on the personalized index. In some examples, the query comprises a natural language query detected from a digital personal assistant.

In one embodiment, the process flow diagram of FIG. 2 is intended to indicate that the blocks of the method 200 are to be executed in a particular order. Alternatively, in other embodiments, the blocks of the method 200 can be executed in any suitable order and any suitable number of the blocks of the method 200 can be included. Further, any number of additional blocks may be included within the method 200, depending on the specific application.

Figure 3A:
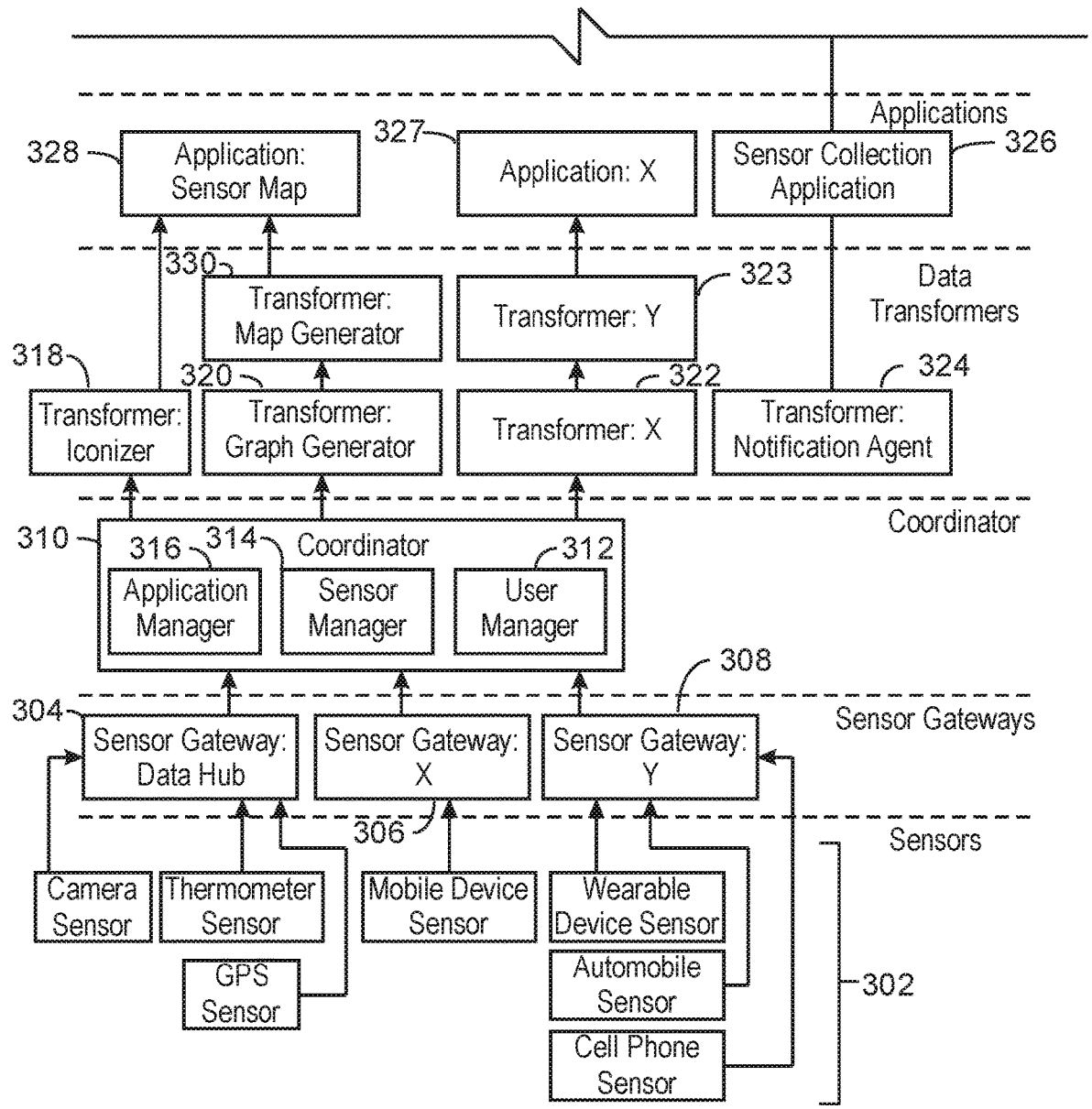
FIGS. 3A-3C depict an example block diagram illustrating data flow in a system that generates sensor data based query results.
Figure 3B:
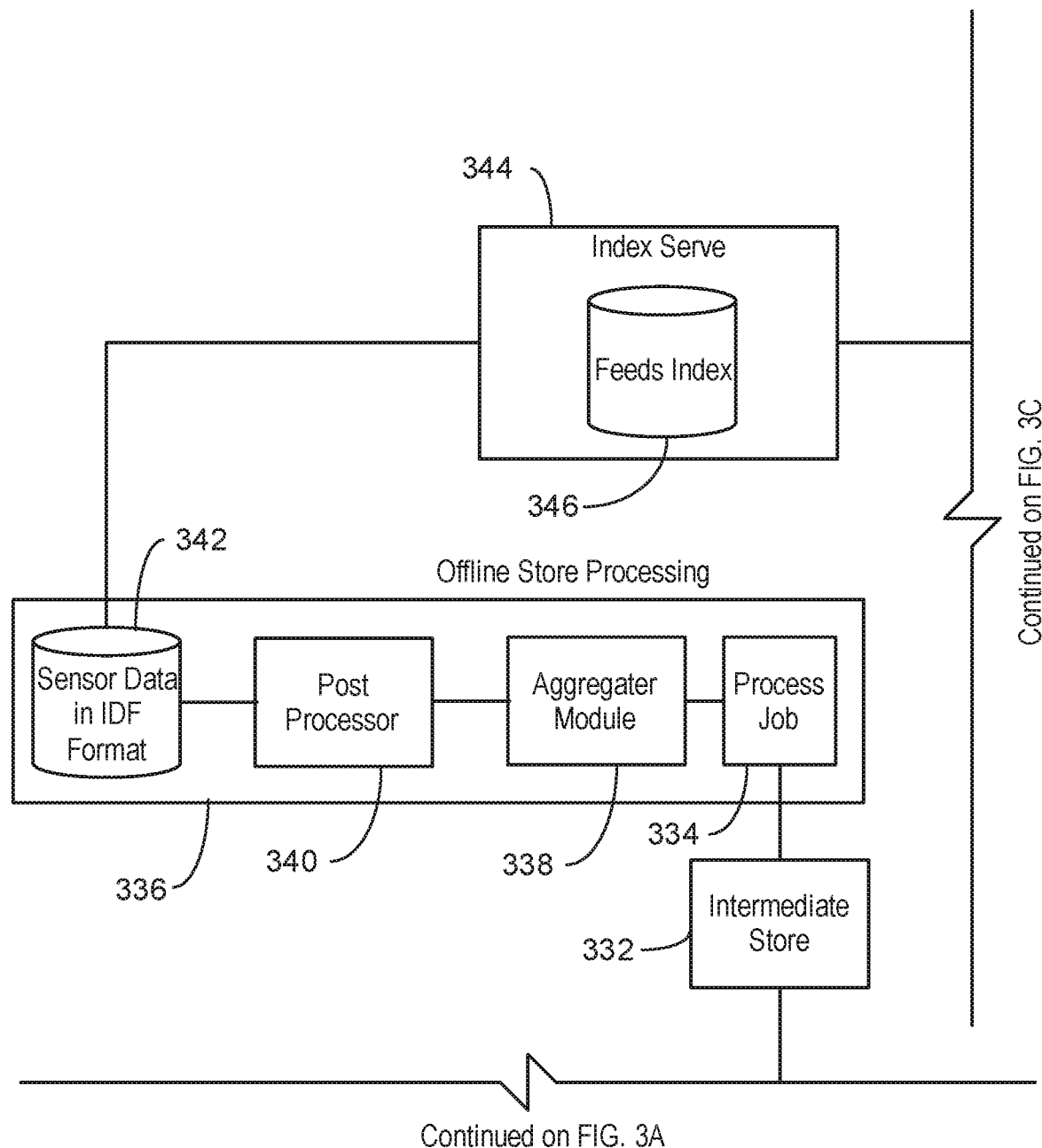
Figure 3C:
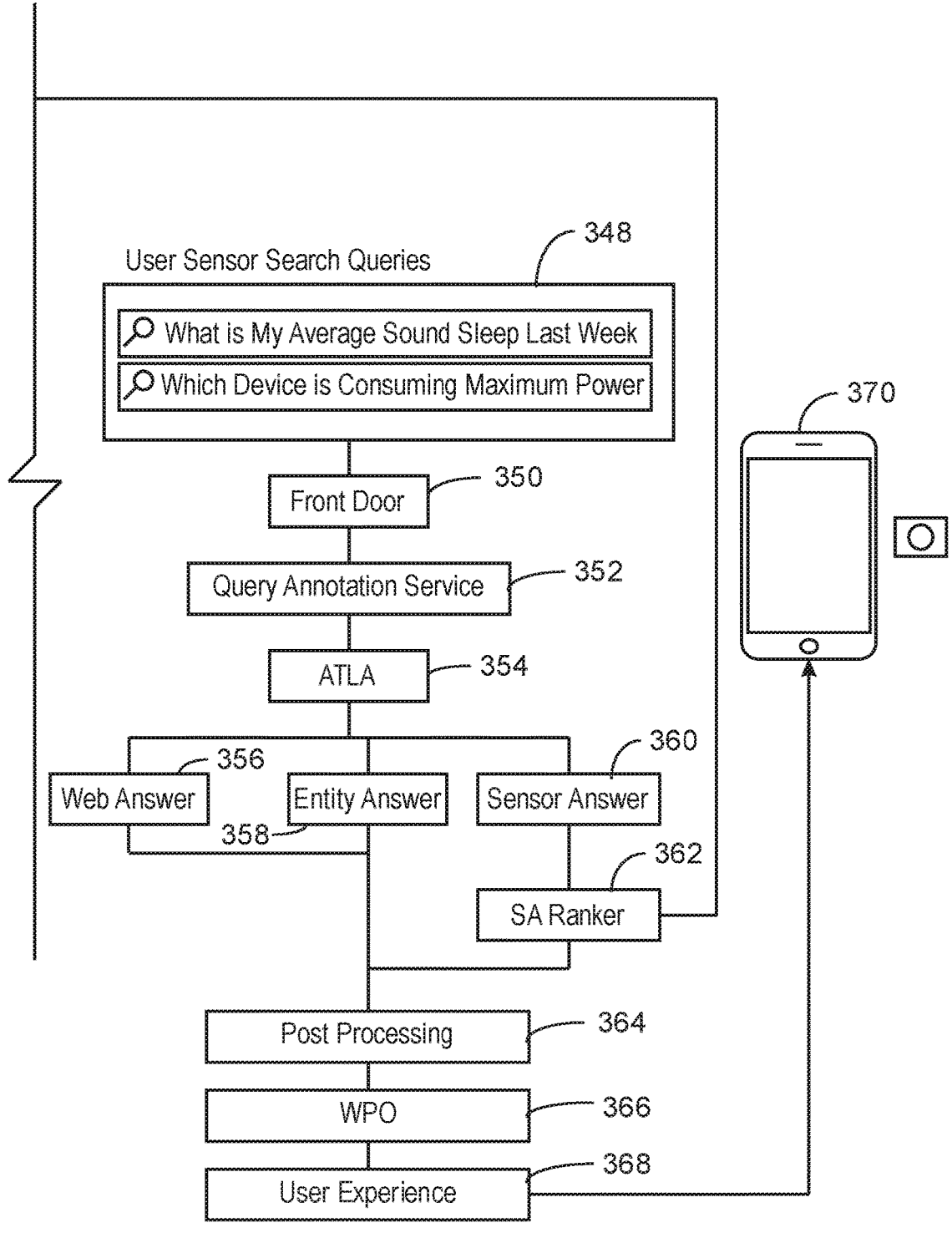

FIGS. 3A-3C depict an example block diagram illustrating data flow in a system that generates sensor data based query results. Beginning with FIG. 3A, in some embodiments, the system 300 can include any number of sensors 302 such as a camera, a thermometer, an accelerometer, a mobile device sensor, a pedometer, an automobile based sensor, a robot based sensor, and the like. In some examples, the sensors 302 can transmit sensor data to sensor gateways 304, 306, and 308. The sensor gateways 304, 306, and 308 can provide a uniform interface between the sensors 302 and a coordinator 310. For example, the sensor gateways 304, 306, and 308 can normalize sensor data detected from sensors built using many different platforms widely varying in processing power, energy, and bandwidth capabilities. In some examples, the sensors 302 can have different access interfaces such as radios to communicate with low powered wireless sensor nodes or serial buses for high-speed communications and isochronous data transfer with higher power and higher bandwidth sensors. In some examples, the sensors 302 may not be connected at all times to the sensor gateways 304, 306, and 308. The sensor gateways 304, 306, and 308 can implement sensor specific techniques to communicate with each sensor 302.

In some embodiments, the coordinator 310 can access the sensor gateways 304, 306, and 308 to obtain sensor data streams, to submit data collection demands, or access sensor characteristics through a standardized web service application programming interface (API). In some examples, each sensor 302 may maintain a separate sensor gateway 306. In some embodiments, the sensor gateways 304, 306, and 308 can implement sharing policies defined by a contributor. For example, the sensor gateways 304, 306, and 308 can maintain raw data in a local database for local applications executed by a sensor 302, which can maintain private data while transmitting non-private data to the coordinator 310. In some embodiments, a datahub sensor gateway 304 can be used by sensors 302 that do not maintain their own sensor gateway. In some examples, individual sensors can publish their data to a datahub sensor gateway 304 through a web service API.

In some embodiments, the coordinator 310 can be a point of access into the system 300 for applications and sensors 302. The coordinator 310 can include a user manager 312, a sensor manager 314, and an application manager 316. The user manager 312 can implement user authentication mechanisms. In some embodiments, the sensor manager 314 can provide an index of available sensors 302 and the characteristics of the sensors 302. For example, the sensor manager 314 can convert user friendly sensor descriptions, such as location boundaries, logical names, or sensor types, to physical sensor identifiers. The sensor manager 314 can also include APIs for sensor gateways 304, 306, and 308 to manipulate sensors 302 and the type of sensors 302. For example, the sensor manager 314 can define new sensor types, register new sensors of defined types, modify characteristics of registered sensors, and delete registered sensors.

In some embodiments, the application manager 316 can be an access point to shared data for additional components in the system 300. In some examples, the application manager 316 can manage the sensor gateways 304, 306, and 308. The application manager 316 can also accept sensing queries from additional components and satisfy the sensing queries based on available sensors 302. In some embodiments, to minimize a load on the sensors 302 or the respective sensor gateways 304, 306, and 308, the application manager 316 can attempt to combine the requests for common data. The application manager 316 can also cache recently accessed sensor data so that future queries without stringent real-time requirements can be served by local caches.

In some embodiments, the coordinator 310 can transmit data to data transformers 318, 320, 322, 323, and 324. The data transformers 318, 320, 322, 323, and 324 can convert data semantics through processing. For example, a data transformer 318-324 can extract the people count from a video stream, perform unit conversion, perform data fusion, and implement data visualization services. In some examples, transformers 318-324 can perform different tasks. For example, an iconizer data transformer 318 can convert raw sensor readings into an icon that represents a sensor type in the icon's shape and sensor value in the icon's color. In some examples, graphical applications can use the output of the iconizer data transformer 318 instead of raw sensor values. In another example, a graph generator data transformer 320 can obtain raw sensor readings and generate 2D spatial graphs. In some embodiments, a notification agent 324 can determine when to transmit sensor data to a sensor collection application 326.

In some examples, applications utilize sensor data for executing instructions. The applications 326, 327, and 328 can be interactive applications where users specify data needs such as user queries for average hiker heart rate over the last season on a particular trail, among others. The applications 326, 327, and 328 can also include automated applications in backend enterprise systems that access sensor streams for business processing, such as an inventory management application that accesses shopper volume from parking counters, customer behaviors from video streams, and correlates them with sales records. In one example, a sensor map application 328 can visualize sensor data from the iconizer transformer 318 and a map generator transformer 330 on top of a map representation of a location.

In some embodiments, the sensor collection application 326 can collect sensor data from any number of the sensors 302 and transmit the sensor data to an intermediate store 332. In some examples, the sensor collection application 326 can implement a policy to collect sensor data that deviates from a previous value by more than a predetermined threshold. For example, the sensor collection application 326 may store sensor data from a thermometer sensor if a value is at least a certain number of degrees above or below a previously detected value. If the sensor collection application 326 detects sensor data below a predetermined threshold, the sensor collection application 326 can discard or delete the sensor data. Accordingly, the sensor collection application 326 can limit a size of sensor data collected from each sensor 302 and transmitted for storage in the intermediate store 332 of FIG. 3B.

In some embodiments, the predetermined threshold can be different for each sensor 302. For example, the predetermined threshold can indicate that a number of steps from a pedometer that exceeds a previously detected value are to be stored in the intermediate store 332. In another example, the predetermined threshold can indicate that location data from a global positioning system sensor is to be stored if a new location is more than a predetermined distance from a previously detected value. In yet another example, the predetermined threshold can indicate that a number of users detected in a video frame or image is to be stored if an increase or decrease from a previously detected value exceeds a threshold value. Accordingly, the intermediate store 332 can store the sensor data that exceeds the predetermined threshold detected from any suitable number of sensors. The smaller sensor data set stored in the intermediate store 332 can enable faster analysis and limit storage requirements for the system 300. In some examples, the smaller sensor data set can enable the intermediate store 332 to store data from a larger number of sensors 302.

In some examples, a process job 334 can retrieve the sensor data stored in the intermediate store 332 as part of offline store processing 336. The process job 334 can transmit the retrieved sensor data to an aggregator module 338 that can aggregate sensor data based on time information. For example, sensor data from sensors 302 stored in the intermediate store 332 can be aggregated based on a common time frame during which the sensor data was collected. In some embodiments, the aggregator module 338 can aggregate sensor data based on any suitable fixed or variable period of time. For example, sensor data from sensors 302 can be aggregated within larger time periods during particular hours of a day or during particular days of a week. In some examples, the aggregator module 338 can aggregate sensor data with smaller time periods during daytime hours when a larger amount of sensor data is collected and aggregate sensor data with larger time periods during nighttime hours when a smaller amount of sensor data is collected.

In some embodiments, the aggregator module 338 can transmit the aggregated sensor data to a post processor 340. In some examples, the post processor 340 can transform the sensor data aggregated based on time periods into an IDF 342. The IDF data can enable a search engine to perform a query based on the aggregated search data in a shorter period of time.

In some embodiments, the IDF data 342 can be transmitted to an index serve 344 that includes a feeds index 346. The feeds index 346 can include a lookup table, wherein data is stored in a <key, value> format. In some examples, the feeds index 346 can create multiple lookup <key, value> pairs based on sensor data. In some embodiments, the index serve 344 can retrieve a generated IDF data file 342 and process the IDF data file 342 into content chunks that are incorporated into a feeds index 346. In some examples, an index as a service (IaaS) environment can retrieve or stream the content chunks generated by the feeds index 346 as the content chunks become available. In some examples, the index serve 344 periodically initiates a merge process. During an index merge on the feeds index 346, the index chunk files are combined into a new complete version of the index.

In some embodiments, a user can provide a query 348 in FIG. 3C through any suitable input device such as a natural language query via a microphone, a query via a keyboard, and the like. In some examples, a front door module 350 can detect a user query and send the query to a backend server. In some examples, a query annotation service 352 or language understanding engine can detect the user query and process the user query to extract information. For example, the query annotation service 352 can perform query parsing or rewriting by parsing the user query to extract tokens. In one example, a user query "my deep sleep percentage last night" can be parsed into [my], [deep sleep], [last night], [percentage]. In some embodiments, the query annotation service 352 can be trained using labelled search engine queries. For example, the query annotation service 352 can detect an intent and entity identification based on information such as [my]=>User, [deep sleep]=>information from band, [last night]=>date/time, and [percentage]=>unit.

In some embodiments, an answers top level aggregator (ATLA) 354 can include federation and caching servers that route queries to answer services such as web answer 356, entity answer 358, and sensor answer 360. In some examples, the web answer 356, entity answer 358, and sensor answer 360 can generate answers or responses to queries independently. In some embodiments, querying an index serve 344 comprises detecting a structured formulated query from the query annotation service 352 or query understanding engine and searching the index for matching sensor data for a sensor answer 360. In some examples, the sensor answer 360 module can transmit queries to an SA ranker 362 that can create a ranked list of sensors sorted in descending order of the probabilities that sensor data from the sensors can include an answer to a query. The SA ranker 362 can also create a matching score between sensor output and a natural language query to further refine the search results. Additionally, the SA ranker 362 can create a confidence score for a final sensor search result with respect to other user experiences.

In some embodiments, a post processing module 364 can rank various answers from the web answer 356, entity answer 358, and sensor answer 360 based on relevance to a query. A whole page organization (WPO) 366 can aggregate the answer and return the results to a device 370 via a user experience 368. In some embodiments, the system can improve query results using user feedback. For example, the system can implement self-learning techniques by refining query results based on user click and satisfaction data.

In some embodiments, a personal digital assistant can detect a user's registered devices. In some examples, a system can automatically correlate that deep sleep information is obtained from user devices such as smart watches, among others. In some examples, this information is transformed into a structured format which is then used by the lookup engine to query the index serve 344.

It is to be understood that the block diagram of FIG. 3 is not intended to indicate that the system 300 is to include all of the components shown in FIG. 3. Rather, the system 300 can include fewer or additional components not illustrated in FIG. 3 (e.g., additional applications, additional modules, additional memory devices, additional network interfaces, etc.).

Figure 4:
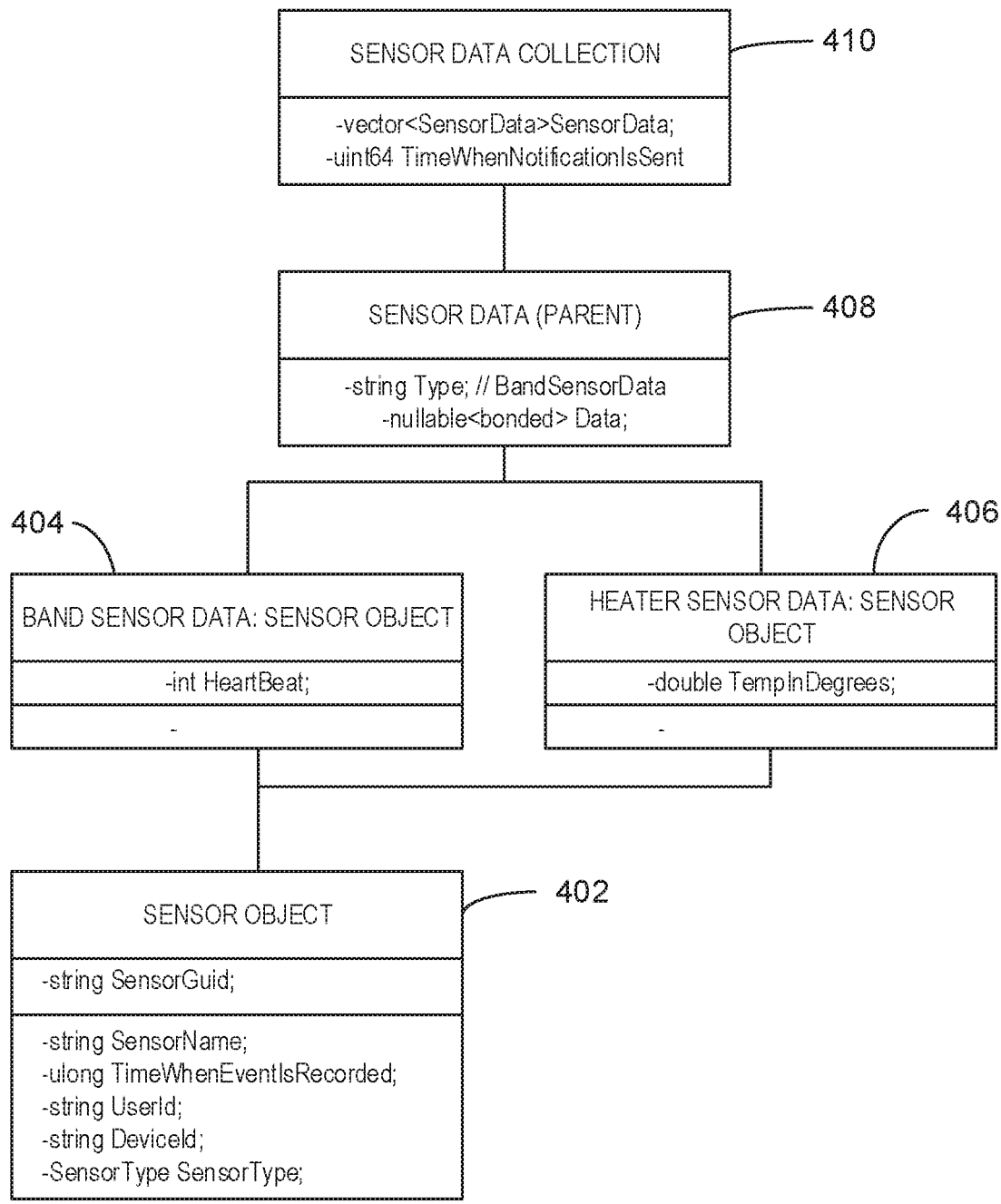
FIG. 4 is an example data schema for sensor data.

FIG. 4 is an example data schema for the sensor data. In some embodiments, the data schema 400 can be generated by the post processor 340 of FIG. 3 and can include a sensor object 402, a band sensor data object 404, a heater sensor data object 406, a sensor data parent 408, and a sensor data collection object 410. In some examples, the sensor object 402 can include a sensor identifier or SensorGuid, a sensor name, a time corresponding to a detected event, a user identifier, a device identifier, and a sensor type. In some embodiments, the band sensor data object 404 and the heater sensor data object 406 can include a heartbeat and temperature, respectively, based on the sensor object 402. In some examples, the sensor data parent 408 can include the band sensor data object 404 and heater sensor data object 406. In some examples, the sensor data collection object 410 can include the sensor data parent 408 along with a time a notification with the sensor data is transmitted. It is to be understood that the data schema of FIG. 4 can include fewer or additional objects not illustrated in FIG. 4.

Figure 5:
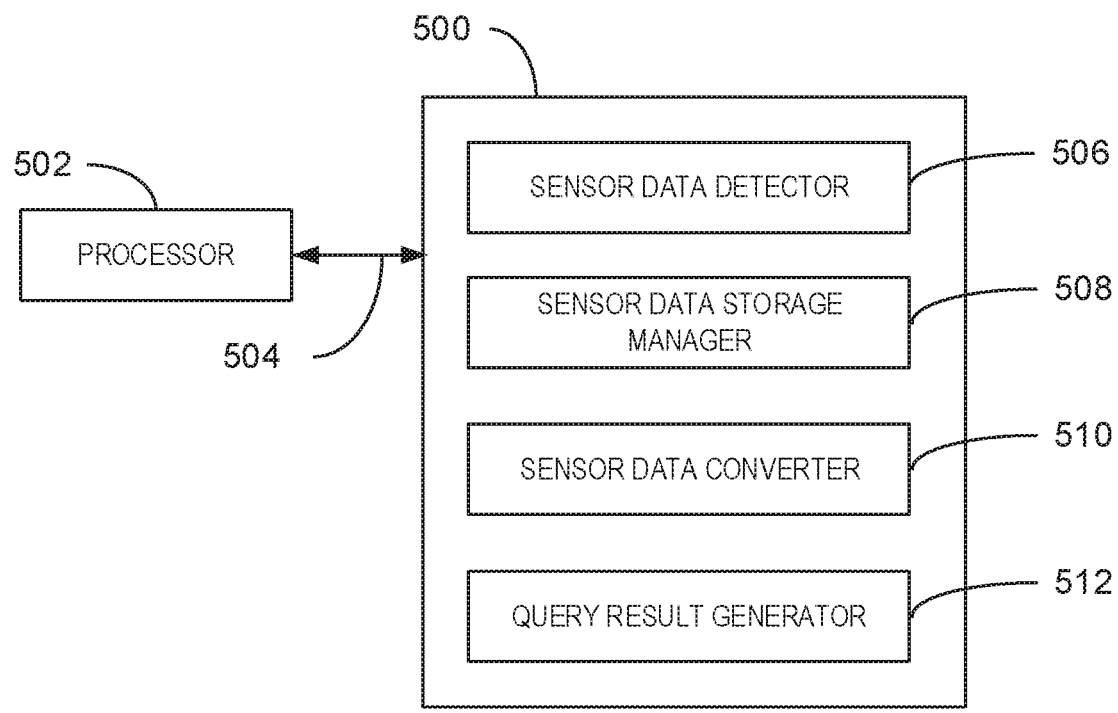
FIG. 5 is a block diagram of an example computer-readable storage media that can generate sensor data based query results.

FIG. 5 is a block diagram of an example computer-readable storage media that can generate sensor data based query results. The tangible, computer-readable storage media 500 may be accessed by a processor 502 over a computer bus 504. Furthermore, the tangible, computer-readable storage media 500 may include code to direct the processor 502 to perform the steps of the current method.

The various software components discussed herein may be stored on the tangible, computer-readable storage media 500, as indicated in FIG. 5. For example, the tangible computer-readable storage media 500 can include a sensor data detector 506 that can detect sensor data from a plurality of sensors. In some embodiments, a sensor data storage manager 508 can store the sensor data as aggregated sensor data, wherein the sensor data is aggregated based on a time corresponding to the sensor data, and wherein the sensor data is stored in a notification based push operation in response to a change in value of the sensor data exceeding a predetermined threshold. In some embodiments, a sensor data converter 510 can convert the aggregated sensor data to an indexable data format (IDF). In some embodiments, a query result generator 512 can provide a low latency query result to a query based on the aggregated sensor data in the indexable data format.

It is to be understood that any number of additional software components not shown in FIG. 5 may be included within the tangible, computer-readable storage media 500, depending on the specific application.

Example 1

In one embodiment, a system for generating sensor data based query results can include a processor to detect sensor data from a plurality of sensors. The processor can also store the sensor data as aggregated sensor data, wherein the sensor data is aggregated based on a time corresponding to the sensor data, and wherein the sensor data is stored with a notification based push operation in response to a change in value of the sensor data exceeding a predetermined threshold. Additionally, the processor can convert the aggregated sensor data to an indexable data format (IDF) and provide a low latency query result to a query based on the aggregated sensor data in the IDF. Alternatively, or in addition, the low latency query results comprises sensor data that is correlated based on location information. Alternatively, or in addition, the predetermined threshold is based on a type of sensor detecting the sensor data. Alternatively, or in addition, the type of sensor comprises a thermometer, a video sensor, a traffic sensor, a pressure sensor, or a humidity sensor. Alternatively, or in addition, the low latency query result comprises one of the plurality of sensors that consumed an amount of power that exceeds a power threshold during a period of time. Alternatively, or in addition, the sensor data is detected by a pedometer, and wherein the processor is to correlate the sensor data by the location information indicating an amount of activity performed at a plurality of locations. Alternatively, or in addition, the processor is to store the aggregated sensor data in the IDF in an offline storage device. Alternatively, or in addition, the processor is to generate a ranking of each of the plurality of sensors based on the query and the sensor data. Alternatively, or in addition, the low latency query result comprises sensor data organized based on the ranking of the plurality of sensors. Alternatively, or in addition, the processor is to detect that the plurality of sensors are associated with a user requesting the query. Alternatively, or in addition, the processor is to generate a personalized index of the sensor data for the user, and wherein the low latency query result is based on the personalized index. Alternatively, or in addition, the query comprises a natural language query detected from a digital personal assistant.

Example 2

In another embodiment, a method for generating sensor data based query results can include detecting sensor data from a plurality of sensors. The method can also include storing the sensor data as aggregated sensor data, wherein the sensor data is aggregated based on a time corresponding to the sensor data, and wherein the sensor data is stored with a notification based push operation in response to a change in value of the sensor data exceeding a predetermined threshold. Additionally, the method can include converting the aggregated sensor data to an indexable data format (IDF) and providing a low latency query result to a query based on the aggregated sensor data in the IDF.

Alternatively, or in addition, the low latency query results comprises sensor data that is correlated based on location information. Alternatively, or in addition, the predetermined threshold is based on a type of sensor detecting the sensor data. Alternatively, or in addition, the type of sensor comprises a thermometer, a video sensor, a traffic sensor, a pressure sensor, or a humidity sensor. Alternatively, or in addition, the low latency query result comprises one of the plurality of sensors that consumed an amount of power that exceeds a power threshold during a period of time. Alternatively, or in addition, the sensor data is detected by a pedometer, and wherein the method includes correlating the sensor data by the location information indicating an amount of activity performed at a plurality of locations. Alternatively, or in addition, the method includes storing the aggregated sensor data in the IDF in an offline storage device. Alternatively, or in addition, the method includes generating a ranking of each of the plurality of sensors based on the query and the sensor data. Alternatively, or in addition, the low latency query result comprises sensor data organized based on the ranking of the plurality of sensors. Alternatively, or in addition, the method includes detecting that the plurality of sensors are associated with a user requesting the query. Alternatively, or in addition, the method includes generating a personalized index of the sensor data for the user, and wherein the low latency query result is based on the personalized index. Alternatively, or in addition, the query comprises a natural language query detected from a digital personal assistant.

Example 3

In yet another embodiment, one or more computer-readable storage media for generating sensor data based query results can include a plurality of instructions that, in response to execution by a processor, cause the processor to detect sensor data from a plurality of sensors. The plurality of instructions can also cause the processor to store the sensor data as aggregated sensor data, wherein the sensor data is aggregated based on a time corresponding to the sensor data, and wherein the sensor data is stored with a notification based push operation in response to a change in value of the sensor data exceeding a predetermined threshold. Additionally, the plurality of instructions can also cause the processor to convert the aggregated sensor data to an indexable data format (IDF) and provide a low latency query result to a query based on the aggregated sensor data in the IDF.

Alternatively, or in addition, the low latency query results comprises sensor data that is correlated based on location information. Alternatively, or in addition, the predetermined threshold is based on a type of sensor detecting the sensor data. Alternatively, or in addition, the type of sensor comprises a thermometer, a video sensor, a traffic sensor, a pressure sensor, or a humidity sensor. Alternatively, or in addition, the low latency query result comprises one of the plurality of sensors that consumed an amount of power that exceeds a power threshold during a period of time. Alternatively, or in addition, the sensor data is detected by a pedometer, and wherein the processor is to correlate the sensor data by the location information indicating an amount of activity performed at a plurality of locations. Alternatively, or in addition, the plurality of instructions can also cause the processor to store the aggregated sensor data in the IDF in an offline storage device. Alternatively, or in addition, the plurality of instructions can also cause the processor to generate a ranking of each of the plurality of sensors based on the query and the sensor data. Alternatively, or in addition, the low latency query result comprises sensor data organized based on the ranking of the plurality of sensors. Alternatively, or in addition, the plurality of instructions can also cause the processor to detect that the plurality of sensors are associated with a user requesting the query. Alternatively, or in addition, the plurality of instructions can also cause the processor to generate a personalized index of the sensor data for the user, and wherein the low latency query result is based on the personalized index. Alternatively, or in addition, the query comprises a natural language query detected from a digital personal assistant.

In particular and in regard to the various functions performed by the above described components, devices, circuits, systems and the like, the terms (including a reference to a "means") used to describe such components are intended to correspond, unless otherwise indicated, to any component which performs the specified function of the described component, e.g., a functional equivalent, even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and events of the various methods of the claimed subject matter.

There are multiple ways of implementing the claimed subject matter, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the claimed subject matter described herein may have aspects that are wholly in hardware, partly in hardware and partly in software, as well as in software.

The aforementioned systems have been described with respect to interoperation between several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the claimed subject matter may have been disclosed with respect to one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A system for generating sensor data based query results comprising:
    a processor to:
    detect sensor data from a plurality of sensors;
    delete the sensor data in response to a change in value of the sensor data from previously detected sensor data not exceeding a predetermined threshold;
    store the sensor data with a notification based push operation in an intermediate storage in response to a change in value of the sensor data from the previously detected sensor data exceeding the predetermined threshold, wherein the stored sensor data in the intermediate storage is non-private data, and wherein private data is maintained in a local database;
    aggregate the stored sensor data in the intermediate storage based on a time the sensor data was detected;
    convert the aggregated sensor data to an indexable data format (IDF); and
    provide a low latency query result to a query based on the aggregated sensor data in the IDF.

2. The system of claim 1, wherein the low latency query results comprises sensor data that is correlated based on location information.

3. The system of claim 1, wherein the predetermined threshold is based on a type of sensor detecting the sensor data.

4. The system of claim 3, wherein the type of sensor comprises a thermometer, a video sensor, a traffic sensor, a pressure sensor, or a humidity sensor.

5. The system of claim 3, wherein the low latency query result comprises one of the plurality of sensors that consumed an amount of power that exceeds a power threshold during a period of time.

6. The system of claim 3, wherein the sensor data is detected by a pedometer, and wherein the processor is to correlate the sensor data by location information indicating an amount of activity performed at a plurality of locations.

7. The system of claim 1, wherein the processor is to store the aggregated sensor data in the IDF in an offline storage device.

8. The system of claim 1, wherein the processor is to generate a ranking of each of the plurality of sensors based on the query and the sensor data.

9. The system of claim 8, wherein the low latency query result comprises sensor data organized based on the ranking of the plurality of sensors.

10. The system of claim 1, wherein the processor is to detect that the plurality of sensors are associated with a user requesting the query.

11. The system of claim 10, wherein the processor is to generate a personalized index of the sensor data for the user, and wherein the low latency query result is based on the personalized index.

12. The system of claim 11, wherein the query comprises a natural language query detected from a digital personal assistant.

13. A method for generating sensor data based query results comprising:
    detecting sensor data from a plurality of sensors;

deleting the sensor data in response to a change in value of the sensor data from previously detected sensor data not exceeding a predetermined threshold;

storing the sensor data with a notification based push operation in an intermediate storage in response to a change in value of the sensor data from the previously detected sensor data exceeding the predetermined threshold, wherein the stored sensor data in the intermediate storage is non-private data, and wherein private data is maintained in a local database;

aggregating the stored sensor data in the intermediate storage based on a time the sensor data was detected;

converting the aggregated sensor data to an indexable data format (IDF); and providing a low latency query result to a query based on the aggregated sensor data in the IDF.

14. The method of claim 13, wherein the low latency query results comprises sensor data that is correlated based on location information.

15. The method of claim 13, wherein the predetermined threshold is based on a type of sensor detecting the sensor data.

16. The method of claim 15, wherein the type of sensor comprises a thermometer, a video sensor, a traffic sensor, a pressure sensor, or a humidity sensor.

17. The method of claim 15, wherein the low latency query result comprises one of the plurality of sensors that consumed an amount of power that exceeds a power threshold during a period of time.

18. The method of claim 15, wherein the sensor data is detected by a pedometer, and wherein a processor is to correlate the sensor data by location information indicating an amount of activity performed at a plurality of locations.

19. One or more computer-readable storage media for generating sensor data based query results comprising a plurality of instructions that, in response to execution by a processor, cause the processor to:

detect sensor data from a plurality of sensors;

delete the sensor data in response to a change in value of the sensor data from previously detected sensor data not exceeding a predetermined threshold;

store the sensor data with a notification based push operation in an intermediate storage in response to a change in value of the sensor data from the previously detected sensor data exceeding the predetermined threshold, wherein the stored sensor data in the intermediate storage is non-private data, and wherein private data is maintained in a local database;

aggregate the stored sensor data in the intermediate storage based on a time the sensor data was detected;

convert the aggregated sensor data to an indexable data format (IDF); and provide a low latency query result to a query based on the aggregated sensor data in the IDF.

20. The one or more computer-readable storage media of claim 19, wherein the predetermined threshold is based on a type of sensor detecting the sensor data.

* * * * *